United States Patent
Ko

(10) Patent No.: US 8,270,099 B2
(45) Date of Patent: Sep. 18, 2012

(54) COMPACT LENS SYSTEM

(75) Inventor: Chun-Cheng Ko, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 107 days.

(21) Appl. No.: 13/015,549

(22) Filed: Jan. 27, 2011

(65) Prior Publication Data

US 2012/0154930 A1    Jun. 21, 2012

(30) Foreign Application Priority Data

Dec. 16, 2010  (TW) ............................... 99144339 A

(51) Int. Cl.
*G02B 9/06* (2006.01)
*G02B 13/18* (2006.01)
*G02B 3/02* (2006.01)

(52) U.S. Cl. ........................................ 359/794; 359/717

(58) Field of Classification Search .......... 359/708–717, 359/754–757, 760, 763, 764, 767–769, 771, 359/772, 779, 780, 784, 791–794
See application file for complete search history.

(56) References Cited

U.S. PATENT DOCUMENTS

| | | | |
|---|---|---|---|
| 6,885,508 B2 * | 4/2005 | Yamaguchi et al. | 359/717 |
| 7,167,324 B2 * | 1/2007 | Saito | 359/794 |
| 2010/0208363 A1 * | 8/2010 | Yasuhiko et al. | 359/715 |

* cited by examiner

*Primary Examiner* — Darryl J Collins
(74) *Attorney, Agent, or Firm* — Altis Law Group, Inc.

(57) ABSTRACT

A lens system, in an order from the object side thereof to the image side thereof, includes an aperture stop, a first lens having positive refractive power, a second lens having positive refractive power. The lens system satisfies the formula: Rmax/TTL>0.97; and 0.31<G1R1/F1<0.33, wherein Rmax denotes the largest imaging circle diameter of the lens system, TTL denotes the total track length of the lens system, G1R1 denotes the curvature radius of the vertex of the first object-side surface, F1 denotes the focal length of the first lens.

8 Claims, 9 Drawing Sheets

COMPACT LENS SYSTEM

BACKGROUND

1. Technical Field

The disclosure relates to lenses and, particularly, to a compact lens system.

2. Description of Related Art

Lens systems with compact structures are widely used in portable electronic devices, such as mobile phone for providing digital images, for the most part meeting miniaturization requirement and cost efficiency. However, various factors affecting size of the lens systems, such as, number and position of lenses employed as well as power distribution of the employed lenses, and shape of each employed lens. Those factors can complicate attempts for decreasing the size of the lens systems. For example, decreasing the size of the lens systems may cause greater distortion and greater chromatic aberration, thus resulting in poor imaging.

Therefore, what is needed is a lens system, which can overcome the above shortcomings.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

Embodiments of the disclosure will now be described in detail with reference to the drawings.

Figure 1:
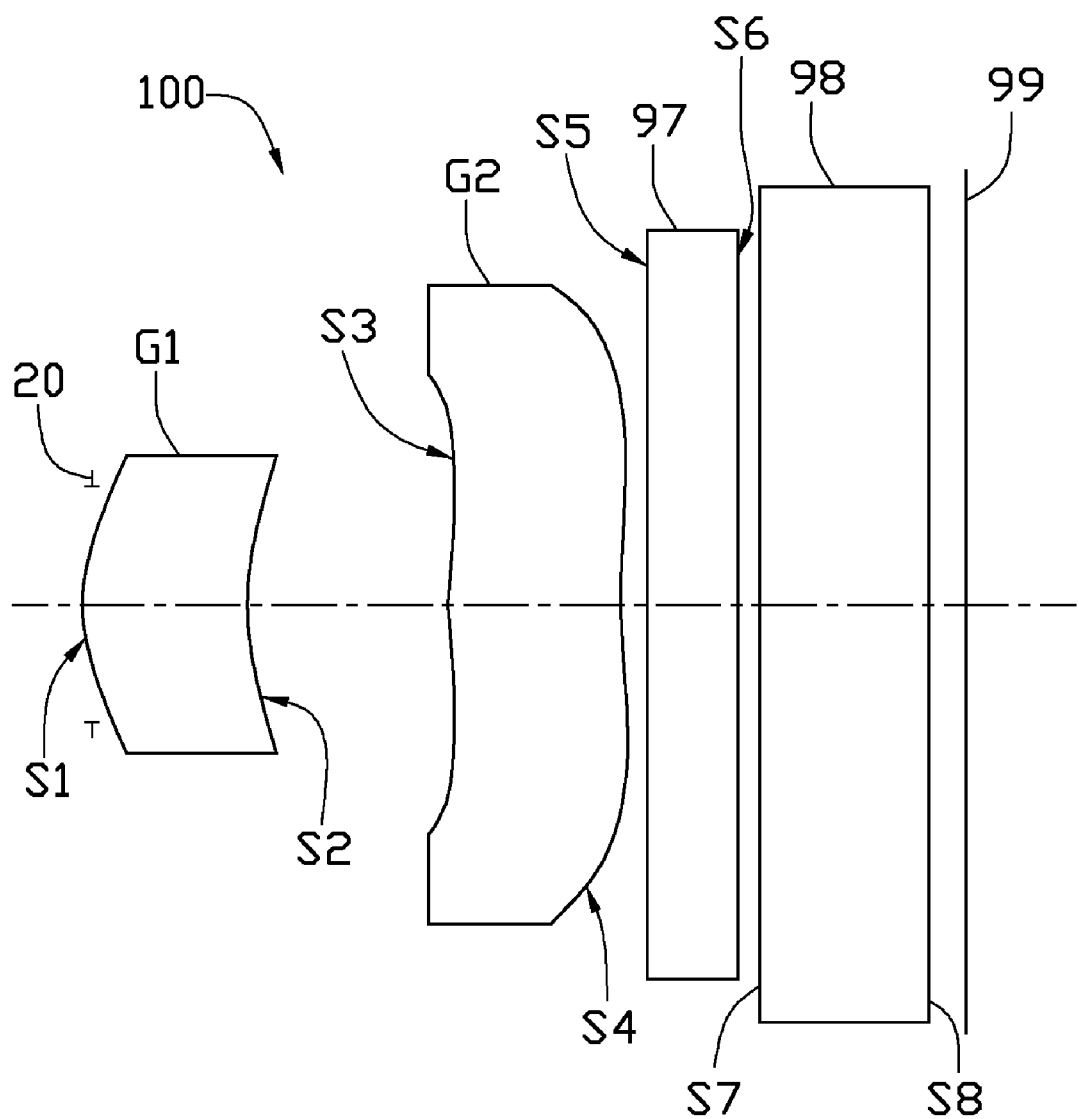
FIG. 1 is a schematic view of a lens system in accordance with a first and a second embodiment.

Referring to FIG. 1, a lens system 100, according to a first embodiment, includes, in an order from the object side to the image side thereof, an aperture stop 20, a first lens G1 of positive refractive power, a second lens G2 of positive refractive power, and an image plane 99.

The first lens G1 has a first object-side surface S1 (first surface S1) oriented towards the object side of the lens system 100, and a first image-side surface S2 (second surface S2) oriented towards the image side of the lens system 100. The second lens G2 has a second object-side surface S3 (third surface S3) substantially oriented towards the object side of the lens system 100, and a second image-side surface S4 (fourth surface S4) substantially oriented towards the image side of the lens system 100.

The lens system 100 is configured for capturing an image. In operation, incident light of an object enter the lens system 100, transmit through the aperture stop 20, the first lens G1, and the second lens G1, thus reaching the image plane 99. An image sensor, such as a charge-coupled device (CCD) or a complementary metal oxide semiconductor device (CMOS) can be provided and can be arranged at the image plane 99 to sense the light rays, thus capturing the image of the object. In this embodiment, the lens system 100 further includes an infrared cut filter 97 and a glass sheet 98. The infrared cut filter 97 includes a fifth surface S5 oriented towards the object side of the lens system 100, and a sixth surface S6 oriented towards the image side of the lens system 100. The glass sheet 98 includes a seventh surface S7 oriented towards the object side of the lens system 100, and an eighth surface S8 oriented towards the image side of the lens system 100. Each of the fifth surface S5, the sixth surface S6, the seventh surface S7, and the eighth surface S8 is a plane surface.

The infrared cut filter 97 is arranged between the second lens G2 and the image plane 99 to eliminate infrared light on the image sensor. The glass sheet 98 is arranged between the infrared cut filter 97 and the image plane 99 to protect the image sensor from being polluted by dust, for example. Overall, the infrared cut filter 97 and the glass sheet 98 can improve quality of the image captured by the image sensor.

The lens system 100 satisfies formulae: Rmax/TTL>0.97, and 0.31<G1R1/F1<0.33. Rmax denotes the largest imaging circle diameter of the lens system 100. TTL denotes the total track length of the lens system 100. G1R1 denotes the curvature radius of the vertex of the first surface S1. F1 denotes the focal length of the first lens G1.

In one aspect, satisfying the formula Rmax/TTL>0.97, the TTL of the lens system 100 is limited, thus the lens system 100 has a relatively small size. That is, the lens system 100 is a compact lens system 100. In another aspect, satisfying the formula 0.31<G1R1/F1<0.33, the lens system 100 achieves a good balance between the TTL and the spherical aberration. That is, the lens system 100 has a relatively high resolution while maintaining a relatively small size. The lens system 100 can be used in a portable electronic device, such as a mobile phone.

The first and the second lenses G1 and G2 each can be made of plastic, polymer, or glass. In this embodiment, the first and the second lenses G1 and G2 each are made of plastic, thus the lens system 100 is cost-efficient.

To obtain even high resolution while maintaining a relatively small size, the lens system 100 may satisfy the formulae: 0.60<G1R2/F1<0.65; 0.17<G2R1/F2<0.27; 0.24<G2R2/F2<0.45. G1R2 denotes the curvature radius of the vertex of the second surface S2. F2 denotes the focal length of the second lens G2. G2R2 denotes the curvature radius of the vertex of the fourth surface S4.

Furthermore, the lens system 100 may satisfy the formulae: N1<1.55, N2>1.56; and G1R1<G1R2, G2R1<G2R2. N1 is the refractive index of the first lens G1, and N2 is the refractive index of the second lens G2. Satisfying the formula N1<1.55, N2>1.56, and the formula G1R1<G1R2, G2R1<G2R2, the lens system 100 has a relative high resolution while maintaining a relatively small distortion. In this embodiment, optical distortion of the lens system 100 is limited in a range from about −1% to about 1%, and TV distortion of the lens system 100 is limited in a range also from about −1% to about 1%. In addition, the chief ray angle (CRA) of the lens system 100 is less than 26 degrees.

Moreover, to correct chromatic aberration, and thus increasing the resolution, the lens system 100 can satisfy the formulae: Vd1>53, and Vd2<33. Vd1 is the Abbe number of the first lens G1, and Vd2 is the Abbe number of the second lens G2.

The first and the second lenses G1 and G2 each have two aspherical surfaces (that is, a object-side aspherical surface and an image-side aspherical surface). Each aspherical surface is shaped according to the formula:

$$x = \frac{ch^2}{1+\sqrt{1-(k+1)c^2h^2}} + \sum A_i h^i,$$

wherein h is a height from the optical axis of the lens system 100 to the aspherical surface, c is a vertex curvature, k is a conic constant, and Ai are i-th order correction coefficients of the aspheric surface.

The following symbols are used:
R: radius of curvature;
D: distance between surfaces on the optical axis of the lens system 100;
Nd: refractive index of lens of d light (wavelength: 587.6 nm); and
Vd: Abbe number of d light (wavelength: 587.6 nm).

In addition, the width of the aperture stop 20 can be omitted and the entire aperture stop 20 can be treated as a plane (or a surface) S0.

The lens system 100 of the first embodiment satisfies the tables 1-2.

TABLE 1

| Surface | R(mm) | D(mm) | Nd | Vd |
|---|---|---|---|---|
| object surface | infinity | 400 | — | — |
| S0 | infinity | −0.04 | — | — |
| S1 | 0.61 | 0.39 | 1.53 | 56.0 |
| S2 | 1.16 | 0.46 | — | — |
| S3 | 2.34 | 0.40 | 1.58 | 31.0 |
| S4 | 3.98 | 0.06 | — | — |
| S5 | infinity | 0.21 | 1.52 | 58.6 |
| S6 | infinity | 0.05 | — | — |
| S7 | infinity | 0.4 | 1.52 | 58.6 |
| S8 | infinity | 0.08 | — | — |
| image plane 99 | infinity | — | — | — |

TABLE 2

| Surface | Aspherical coefficient |
|---|---|
| S1 | K = −2.8383; A4 = 2.1438; A6 = −10.7091; A8 = 110.5179; A10 = −405.4218 |
| S2 | K = 1.6852; A4 = 1.1168; A6 = −8.4046; A8 = 130.3444; A10 = −322.2342 |
| S3 | K = −6.2140; A4 = −0.7992; A6 = −3.9445; A8 = 24.3002; A10 = −57.7720 |
| S4 | K = −4.2374; A4 = −0.3639; A6 = −1.7585; A8 = 4.6444; A10 = −5.0542 |

Figure 2:
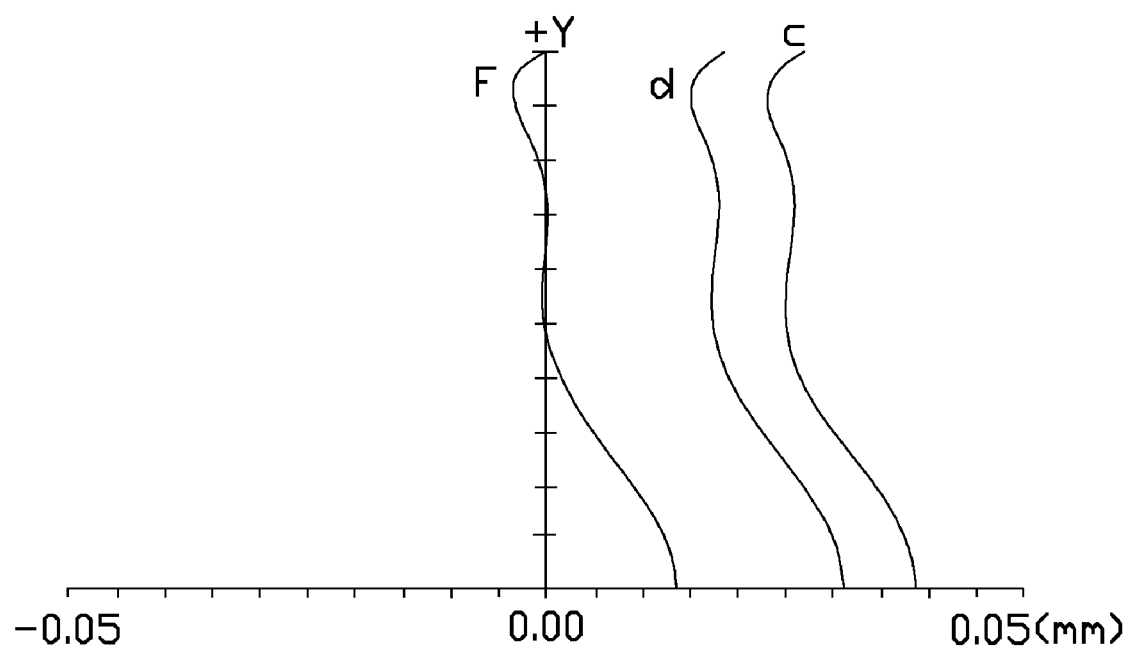
FIG. 2 is a graph showing spherical aberration of the lens system of FIG. 1, in accordance with a first embodiment.
Figure 3:
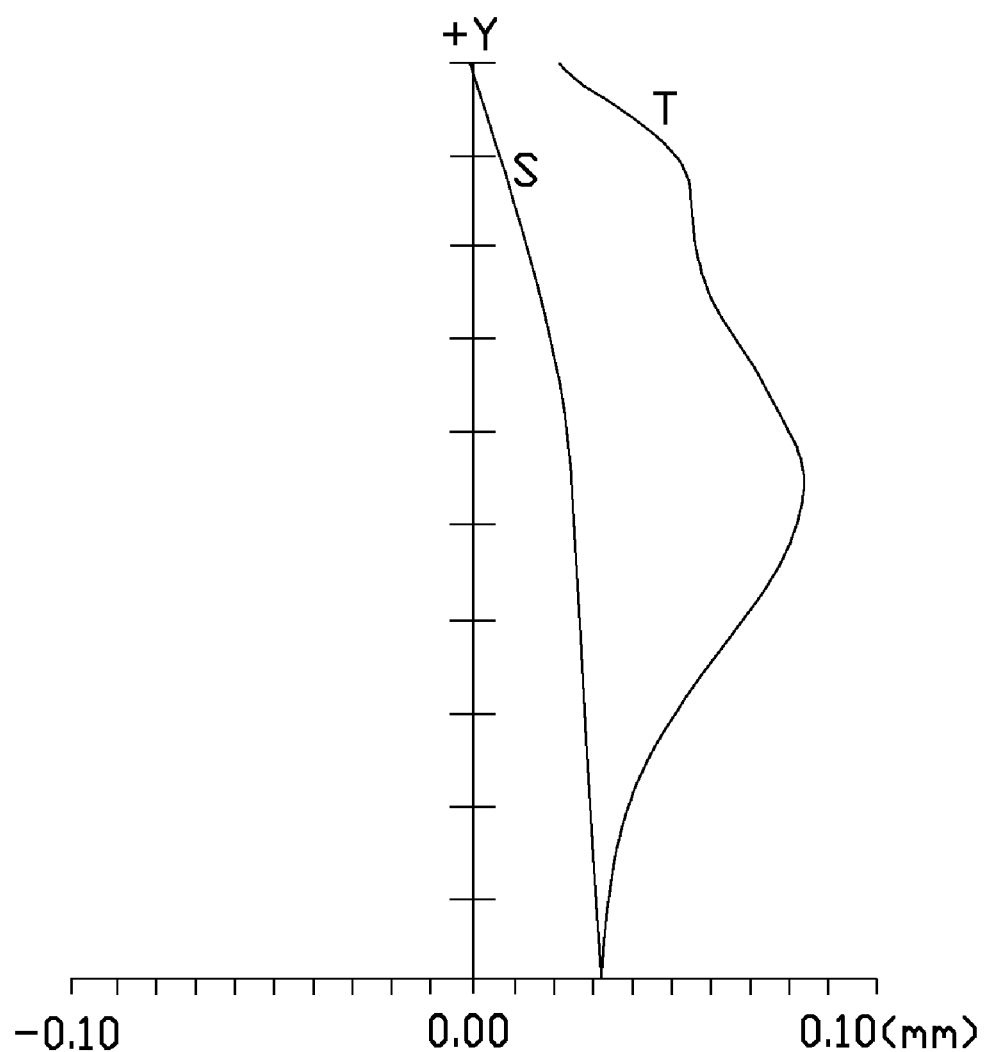
FIG. 3 is a graph showing field curvature of the lens system of FIG. 1, in accordance with a first embodiment.
Figure 4:
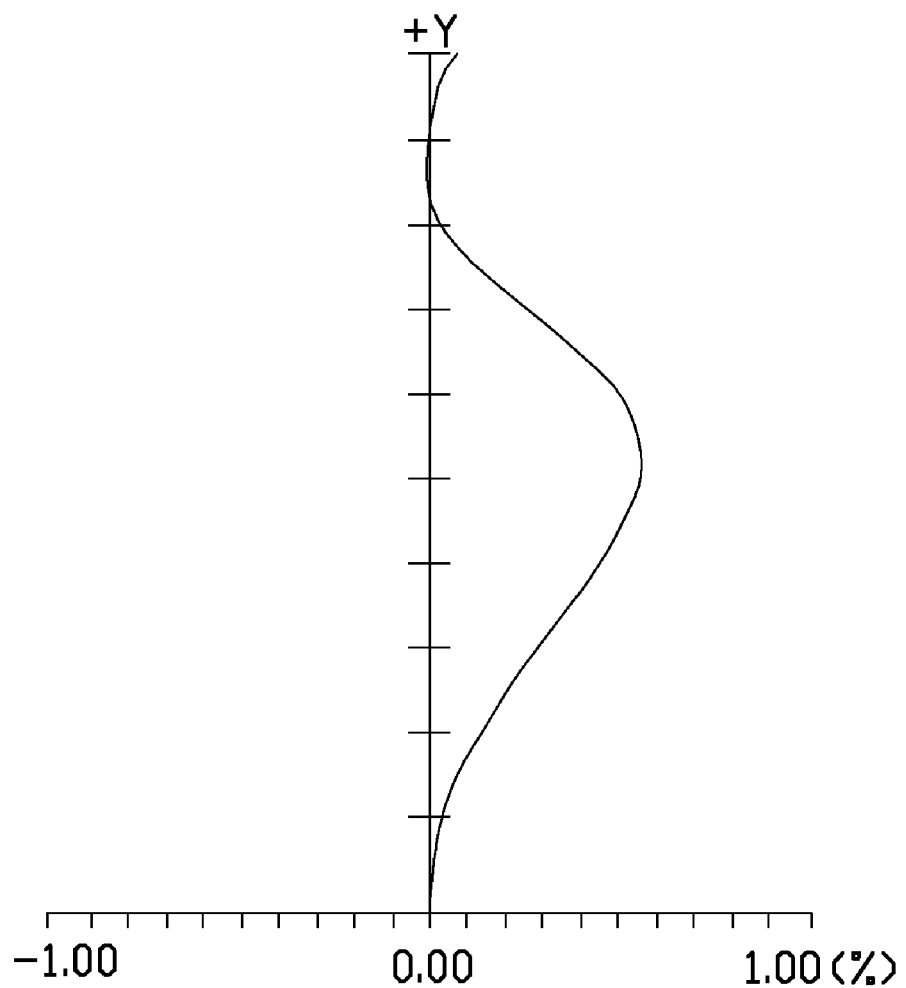
FIG. 4 is a graph showing distortion of the lens system of FIG. 1, in accordance with a first embodiment.
Figure 5:
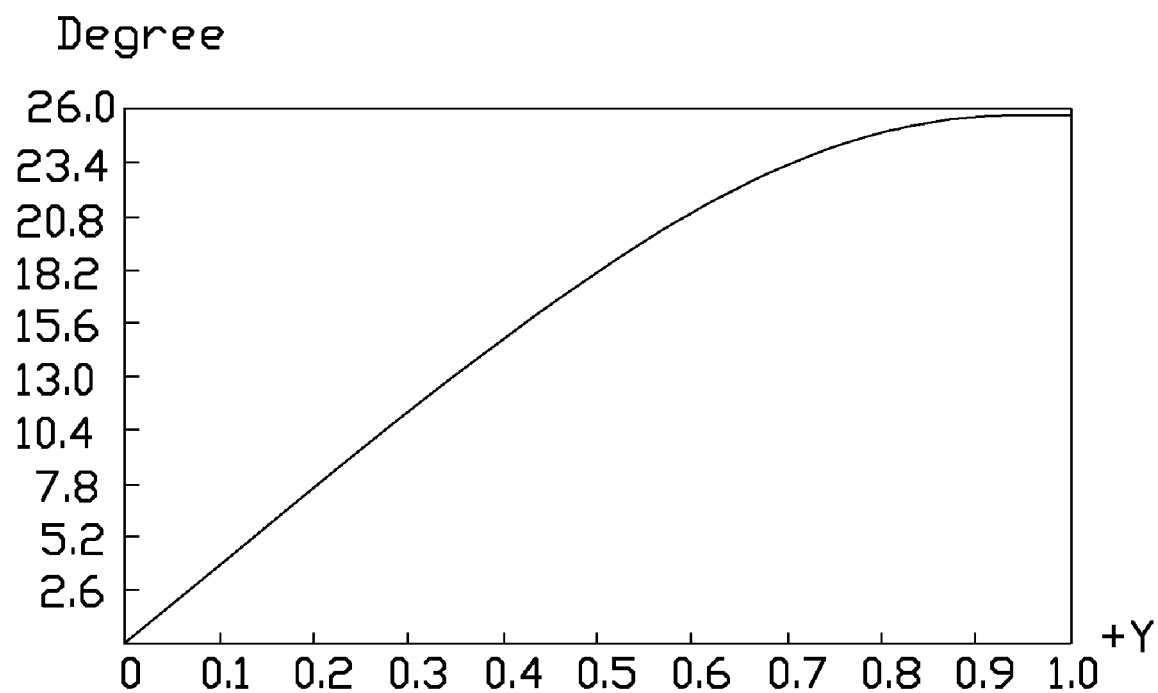
FIG. 5 is a graph showing chief ray angle of the lens system of FIG. 1, in accordance with a first embodiment.

As shown in FIG. 2, the curves F, d, and C are respective spherical aberration characteristic curves of F light (wavelength: 486.1 nm), d light (wavelength: 587.6 nm), and C light (wavelength: 656.3 nm) of the lens system 100 of the first embodiment. In this embodiment, spherical aberration of visible light (400 nm-700 nm) of the lens system 100 is in a range of: −0.05 mm~0.05 mm. As shown in FIG. 3, the curves T and S are the tangential field curvature curve and the sagittal field curvature curve, respectively. In this embodiment, field curvature of the lens system 100 is limited to a range of: 0~0.10 mm. As shown in FIG. 4, distortion of the lens system 100 is limited in a range of: −1.00%~1.00%. As shown in FIG. 5, the chief ray angle of the lens system 100 is limited in a range of: 0~26.0 degrees. Overall, in this embodiment, the spherical aberration, the field curvature, the distortion, and the chief ray angle are limited in a small range.

Referring to FIG. 1, FIG. 6, FIG. 7, FIG. 8, and FIG. 9, a lens system 100, according to a second embodiment, is essentially similar to that of the first embodiment in structure but satisfies tables 3-4 instead of tables 1-2.

TABLE 3

| Surface | R(mm) | D(mm) | Nd | Vd |
|---|---|---|---|---|
| object surface | infinity | 400 | — | — |
| S0 | infinity | −0.04 | — | — |
| S1 | 0.60 | 0.39 | 1.53 | 56.0 |
| S2 | 1.19 | 0.48 | — | — |
| S3 | 2.30 | 0.40 | 1.58 | 31.0 |
| S4 | 3.10 | 0.06 | — | — |
| S5 | infinity | 0.21 | 1.52 | 58.6 |
| S6 | infinity | 0.05 | — | — |
| S7 | infinity | 0.4 | 1.52 | 58.6 |
| S8 | infinity | 0.08 | — | — |
| image plane 99 | — | — | — | — |

TABLE 4

| Surface | Aspherical coefficient |
|---|---|
| S1 | K = −4.2640; A4 = 2.5635; A6 = −5.1029; A8 = 21.1922; A10 = −24.4866 |
| S2 | K = 2.4026; A4 = 1.4113; A6 = −16.8679; A8 = 212.7956; A10 = −590.2169 |
| S3 | K = −126.0165; A4 = −0.3700; A6 = −5.5929; A8 = 30.2835; A10 = −78.7899 |
| S4 | K = 0.6002; A4 = −0.7671; A6 = 0.0838; A8 = 0.9008; A10 = −2.6597 |

Figure 6:
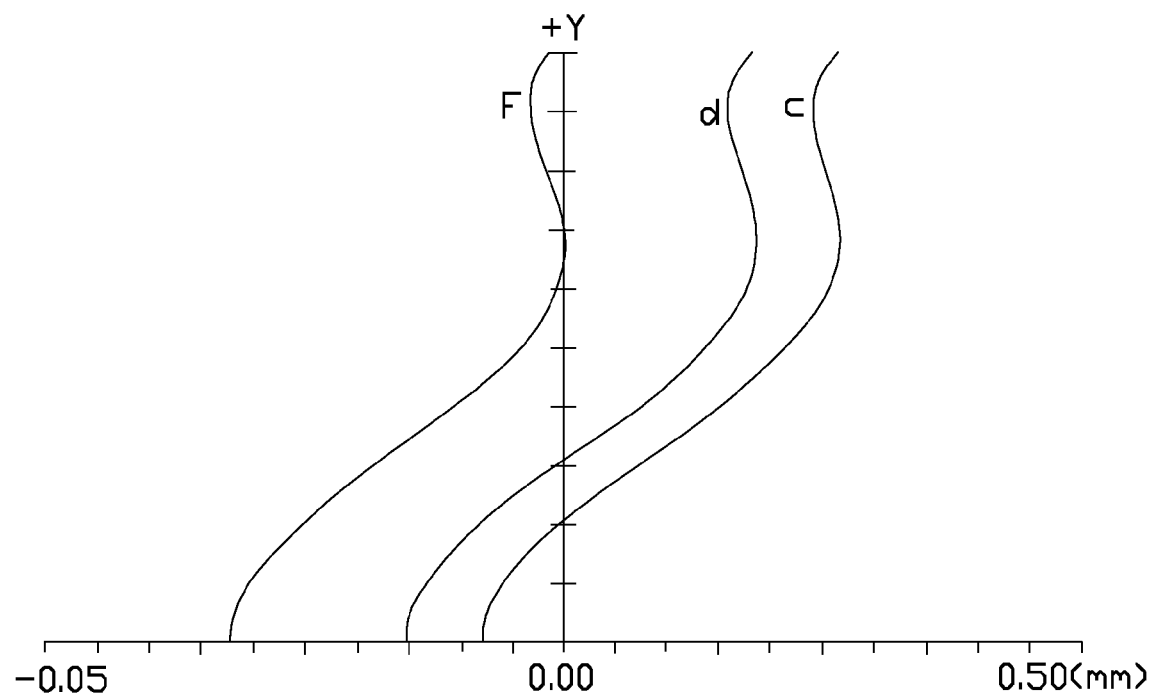
FIG. 6 is graph showing spherical aberration of the lens system of FIG. 1, in accordance with a second embodiment.
Figure 7:
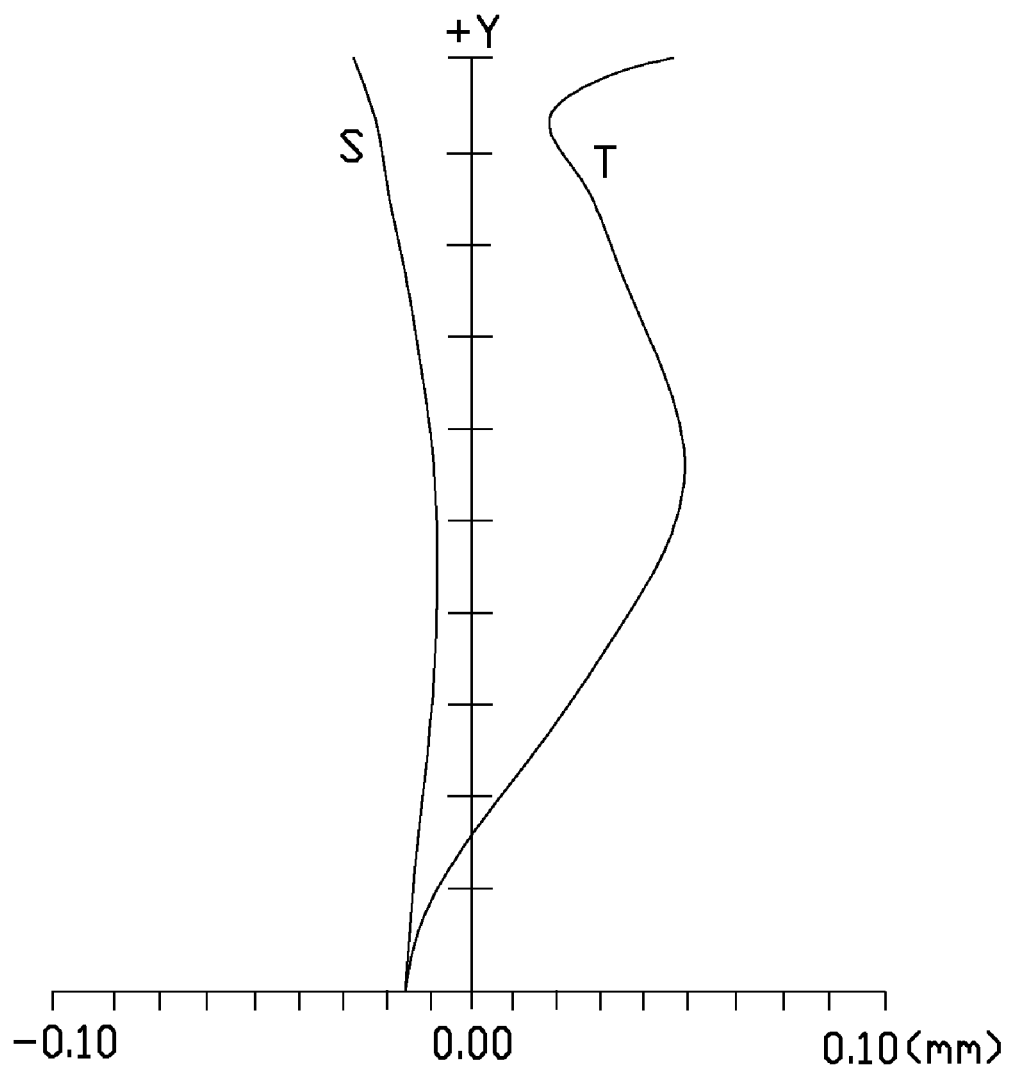
FIG. 7 is a graph showing field curvature of the lens system of FIG. 1, in accordance with a second embodiment.
Figure 8:
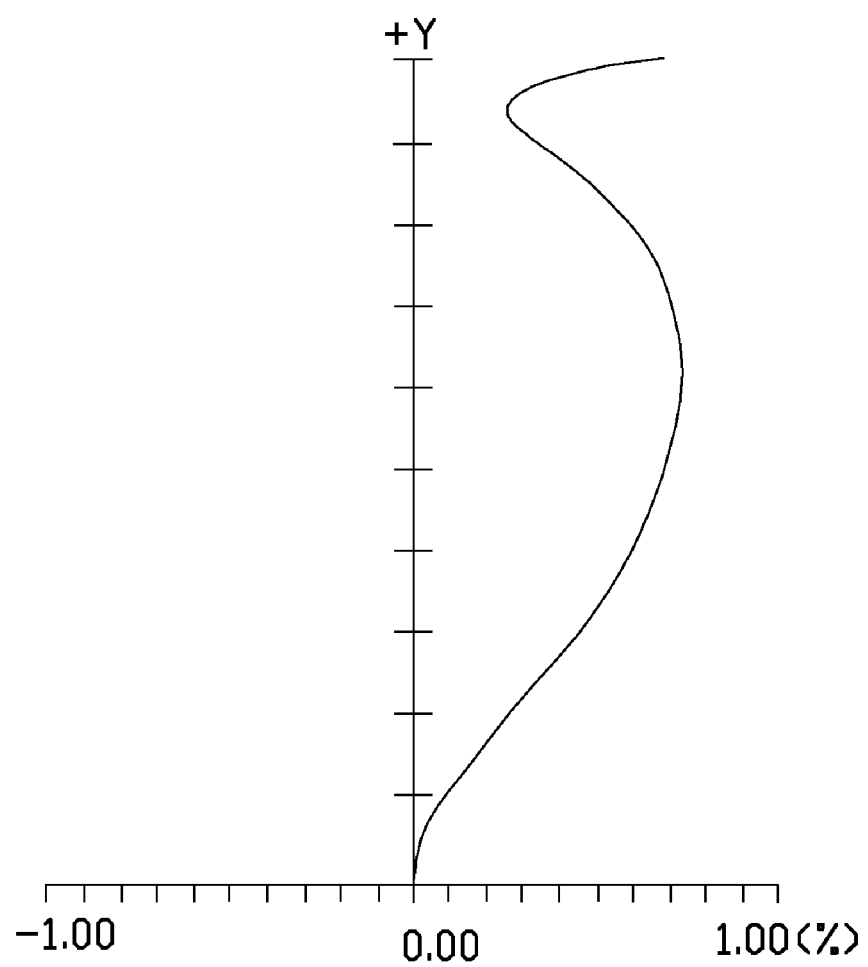
FIG. 8 is a graph showing distortion of the lens system of FIG. 1, in accordance with a second embodiment.
Figure 9:
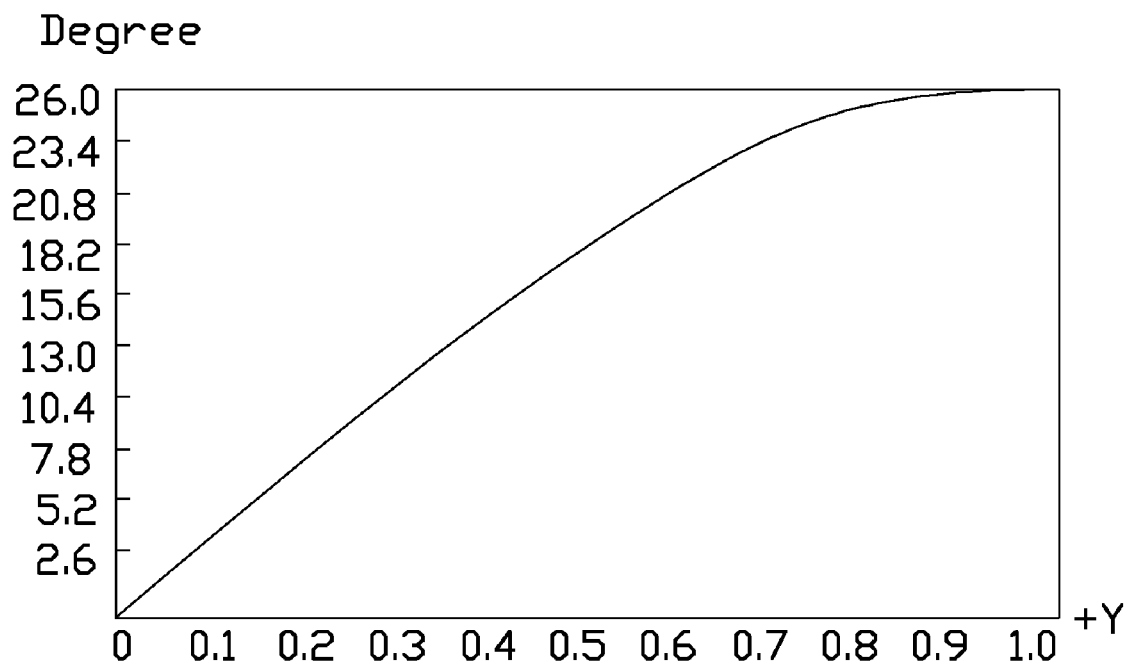
FIG. 9 is a graph showing chief ray angle of the lens system of FIG. 1, in accordance with a second embodiment.

As shown in FIG. 6, the curves F, d, and C are respective spherical aberration characteristic curves of F light (wavelength: 486.1 nm), d light (wavelength: 587.6 nm), and C light (wavelength: 656.3 nm) of the lens system 100 of the second embodiment. In this embodiment, spherical aberration of visible light (400 nm-700 nm) of the lens system 100 is in a range of: −0.05 mm~0.05 mm. As shown in FIG. 7, the curves T and S are the tangential field curvature curve and the sagittal field curvature curve, respectively. In this embodiment, field curvature of the lens system 100 is limited to a range of: 0~0.10 mm. As shown in FIG. 8, distortion of the lens system 100 is limited in a range of: −1.00%~1.00%. As shown in FIG. 9, the chief ray angle of the lens system 100 is limited in a range of: 0~26.0 degrees. Overall, in this embodiment, the spherical aberration, the field curvature, the distortion, and the chief ray angle are limited in a small range.

It is understood that the above-described embodiments are intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:
1. A lens system, in an order from the object side thereof to the image side thereof, comprising:
   an aperture stop;
   a first lens having a positive refractive power, the first lens having a first object-side surface and a first image-side surface; and a second lens having a positive refractive power, the second lens having a second object-side surface and a second image-side surface;

wherein the lens system satisfies the following formulae: $R_{max}/TTL>0.97$; and $0.31<G1R1/F1<0.33$, wherein $R_{max}$ denotes the largest imaging circle diameter of the lens system, TTL denotes the total track length of the lens system, G1R1 denotes the curvature radius of the vertex of the first object-side surface, and F1 denotes the focal length of the first lens.

2. The lens system of claim 1, further satisfying the following formulae: $0.60<G1R2/F1<0.65$; $0.17<G2R1/F2<0.27$; and $0.24<G2R2/F2<0.45$; wherein G1R2 denotes the curvature radius of the vertex of the first image-side surface, F2 denotes the focal length of the second lens, G2R2 denotes the curvature radius of the vertex of the second image-side surface.

3. The lens system of claim 2, further satisfying the following formulae: $N1<1.55$, $N2>1.56$, $G1R1<G1R2$, and $G2R1<G2R2$, wherein N1 denotes the refractive index of the first lens, and N2 denotes the refractive index of the second lens.

4. The lens system of claim 3, further satisfying the following formulae: $Vd1>53$, and $Vd2<33$, wherein Vd1 denotes the Abbe number of the first lens, and Vd2 denotes the Abbe number of the second lens.

5. The lens system of claim 1, wherein each of the first object-side surface, the first image-side surface, the second object-side surface, and the second image-side surface is an aspherical surface.

6. The lens system of claim 1, wherein each of the first and the second lenses is made of plastic, polymer, or glass.

7. The lens system of claim 1, further comprising an infrared cut filter, the infrared cut filter being arranged between the second lens and an image plane associated therewith.

8. The lens system of claim 7, further comprising a glass sheet, the glass sheet being arranged between the infrared cut filter and the image plane.

\* \* \* \* \*